(12) United States Patent
Zeng et al.

(10) Patent No.: US 11,196,128 B2
(45) Date of Patent: Dec. 7, 2021

(54) BATTERY MODULE AND BUSBAR ASSEMBLY THEREOF

(71) Applicant: CONTEMPORARY AMPEREX TECHNOLOGY CO., LIMITED, Ningde (CN)

(72) Inventors: Yuqun Zeng, Ningde (CN); Fenggang Zhao, Ningde (CN); Daohui Liu, Ningde (CN); Yangzhi Huang, Ningde (CN); Chuanlian Chen, Ningde (CN); Shengtian Cai, Ningde (CN); Hanqing Gao, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 164 days.

(21) Appl. No.: 16/515,960

(22) Filed: Jul. 18, 2019

(65) Prior Publication Data

US 2020/0091489 A1     Mar. 19, 2020

(30) Foreign Application Priority Data

Sep. 14, 2018  (CN) .......................... 201811075009.3

(51) Int. Cl.
*H01M 50/502* (2021.01)
*H01M 50/529* (2021.01)

(52) U.S. Cl.
CPC ....... *H01M 50/502* (2021.01); *H01M 50/529* (2021.01)

(58) Field of Classification Search
CPC ... H01M 50/50; H01M 50/528; H01M 50/529
See application file for complete search history.

(56) References Cited

U.S. PATENT DOCUMENTS

| 2015/0270525 A1 | 9/2015 | Jeong et al. |
| 2017/0062789 A1 | 3/2017 | Sim et al. |
| 2019/0259996 A1* | 8/2019 | Fritz .................. H01M 50/502 |

FOREIGN PATENT DOCUMENTS

| CN | 106953059 A | 7/2017 |
| DE | 202017006171 U1 | 2/2018 |

OTHER PUBLICATIONS

Contemporary Amperex Technology Co., Limited, Communication Pursuant to Article 94(3), EP 19187029.4, Sep. 17, 2020, 4 pgs.

* cited by examiner

*Primary Examiner* — James Lee
(74) *Attorney, Agent, or Firm* — Morgan, Lewis & Bockius LLP (57) ABSTRACT

The present disclosure provides a battery module and a busbar assembly thereof. The busbar assembly comprises a first busbar, a second busbar and a first insulator. The first busbar comprises a first connecting portion connected to a first battery unit, a second connecting portion connected to a second battery unit and a first main portion connecting the first connecting portion and the second connecting portion. The second busbar comprises a third connecting portion connected to a third battery unit, a fourth connecting portion connected to a fourth battery unit and a second main portion connecting the third connecting portion and the fourth connecting portion. The first main portion partially overlaps the second main portion, and the first insulator insulates the second main portion and the first main portion. The first battery unit, the third battery unit, the second battery unit and the fourth battery unit are arranged sequentially.

18 Claims, 5 Drawing Sheets

BATTERY MODULE AND BUSBAR ASSEMBLY THEREOF

CROSS-REFERENCE TO RELATED APPLICATIONS

The present application claims priority to Chinese patent application No. CN201811075009.3, filed on Sep. 14, 2018, which is incorporated herein by reference in its entirety.

FIELD OF THE PRESENT DISCLOSURE

The present disclosure relates to the field of battery, and particularly relates to a battery module and a busbar assembly thereof.

BACKGROUND OF THE PRESENT DISCLOSURE

A battery module generally comprises a plurality of batteries and a plurality of busbars, the busbars are connected with the batteries to realize the electrical connection of the batteries. However, in the existing battery module, the busbar only can connect adjacent batteries, which leads to the connecting sequence of the batteries being invariable and the electrical circuit of the battery module being undiversified, and is difficult to satisfy the requirement of the battery module on diversified electrical circuit.

SUMMARY OF THE PRESENT DISCLOSURE

In view of the problem existing in the background, an object of the present disclosure is to provide a battery module and a busbar assembly thereof, which can realize the diversification of an electrical circuit in the battery module, and satisfy the requirement of the battery module on diversified electrical circuit.

In order to achieve the above object, the present disclosure provides a battery module and a busbar assembly thereof.

The busbar assembly comprises a first busbar, a second busbar and a first insulator. The first busbar comprises a first connecting portion, a second connecting portion and a first main portion, the first connecting portion is capable of being connected to a first battery unit, the second connecting portion is capable of being connected to a second battery unit, the first main portion connects the first connecting portion and the second connecting portion. The second busbar comprises a third connecting portion, a fourth connecting portion and a second main portion, the third connecting portion is capable of being connected to a third battery unit, the fourth connecting portion is capable of being connected to a fourth battery unit, the second main portion connects the third connecting portion and the fourth connecting portion. In a height direction, the first main portion and the second main portion are partially overlapped with each other, and the first insulator insulates the second main portion and the first main portion. The first battery unit, the third battery unit, the second battery unit and the fourth battery unit are capable of being arranged sequentially in a longitudinal direction.

The first connecting portion, the third connecting portion, the second connecting portion and the fourth connecting portion are sequentially arranged and spaced from each other in the longitudinal direction. The first connecting portion and the second connecting portion are positioned at the same side with respect to the first main portion in a transverse direction, the third connecting portion and the fourth connecting portion are positioned at the same side with respect to the second main portion in the transverse direction.

The first busbar is provided with a first notch. The first notch is positioned above the second main portion in the height direction.

The first notch is positioned at an end of the first main portion in the longitudinal direction. The first busbar further comprises a first extending portion, the first extending portion is provided at a side of the second connecting portion close to the first connecting portion, and the first extending portion connects the second connecting portion and the first main portion.

The first busbar is further provided with a second notch, the second notch and the first notch are respectively positioned at two ends of the first main portion in the longitudinal direction. The first busbar further comprises a second extending portion, the second extending portion is provided at a side of the first connecting portion close to the second connecting portion, and the second extending portion connects the first connecting portion and the first main portion.

The first main portion comprises a first region, a second region and a third region, the first region, the second region and the third region are arranged sequentially in the longitudinal direction. The first region is connected with the first connecting portion, the third region is connected with the second connecting portion, the second region is positioned between the first region and the third region. In the height direction, the third region and the second main portion are overlapped with each other. The second region is arch in shape and protrudes relative to the first region and the third region.

The second main portion comprises a fourth region, a fifth region and a sixth region, the fourth region, the fifth region and the sixth region are arranged sequentially in the longitudinal direction. The sixth region is connected with the fourth connecting portion, the fifth region is connected with the sixth region and bends relative to the sixth region, the fourth region is connected with the fifth region and overlaps the first main portion in the height direction. The third connecting portion comprises a seventh region and an eighth region, the seventh region is capable of being connected with the third battery unit, the eighth region is connected with the seventh region and bends relative to the seventh region, the fourth region is connected with the eighth region.

The second main portion further comprises a ninth region, the ninth region is positioned between the fourth region and the fifth region. The second main portion is arch in shape and protrudes relative to the fourth region.

The battery module comprises a first battery unit, a second battery unit, a third battery unit, a fourth battery unit and the busbar assembly. The first battery unit, the third battery unit, the second battery unit and the fourth battery unit are arranged sequentially in a longitudinal direction. The first connecting portion is connected with the first battery unit, the second connecting portion is connected with the second battery unit. The third connecting portion is connected with the third battery unit, the fourth connecting portion is connected with the fourth battery unit.

The present disclosure has the following beneficial effects: in the battery module of the present disclosure, the busbar can connect batteries between which other battery is interposed, and by allowing the busbars to reasonably cooperate with each other, it can realize the diversification of an electrical circuit in the battery module, satisfy the requirement of the battery module on diversified electrical circuit.

Reference numerals in figures are represented as follows:

1 battery
  11 first battery unit
  12 second battery unit
  13 third battery unit
  14 fourth battery unit
2 busbar assembly
  21 first busbar
    211 first connecting portion
    212 second connecting portion
    213 first main portion
      213A first region
      213B second region
      213C third region
    214 first notch
    215 second notch
    216 first extending portion
    217 second extending portion
  22 second busbar
    221 third connecting portion
      221A seventh region
      221B eighth region
    222 fourth connecting portion
    223 second main portion
      223A fourth region
      223B fifth region
      223C sixth region
      223D ninth region
  23 first insulator
  24 second insulator
  25 third busbar
3 end plate
4 side plate
5 wiring harness assembly
T1 positive electrode terminal
T2 negative electrode terminal
P recessed portion
X transverse direction
Y longitudinal direction
Z height direction

DETAILED DESCRIPTION

To make the object, technical solutions and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second", "third" and the like are only used for illustrative purposes and are not to be construed as expressing or implying a relative importance. The term "plurality" is two or more. Unless otherwise defined or described, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present disclosure will be further described in detail in combination with the exemplary embodiments and the figures.

Figure 1:
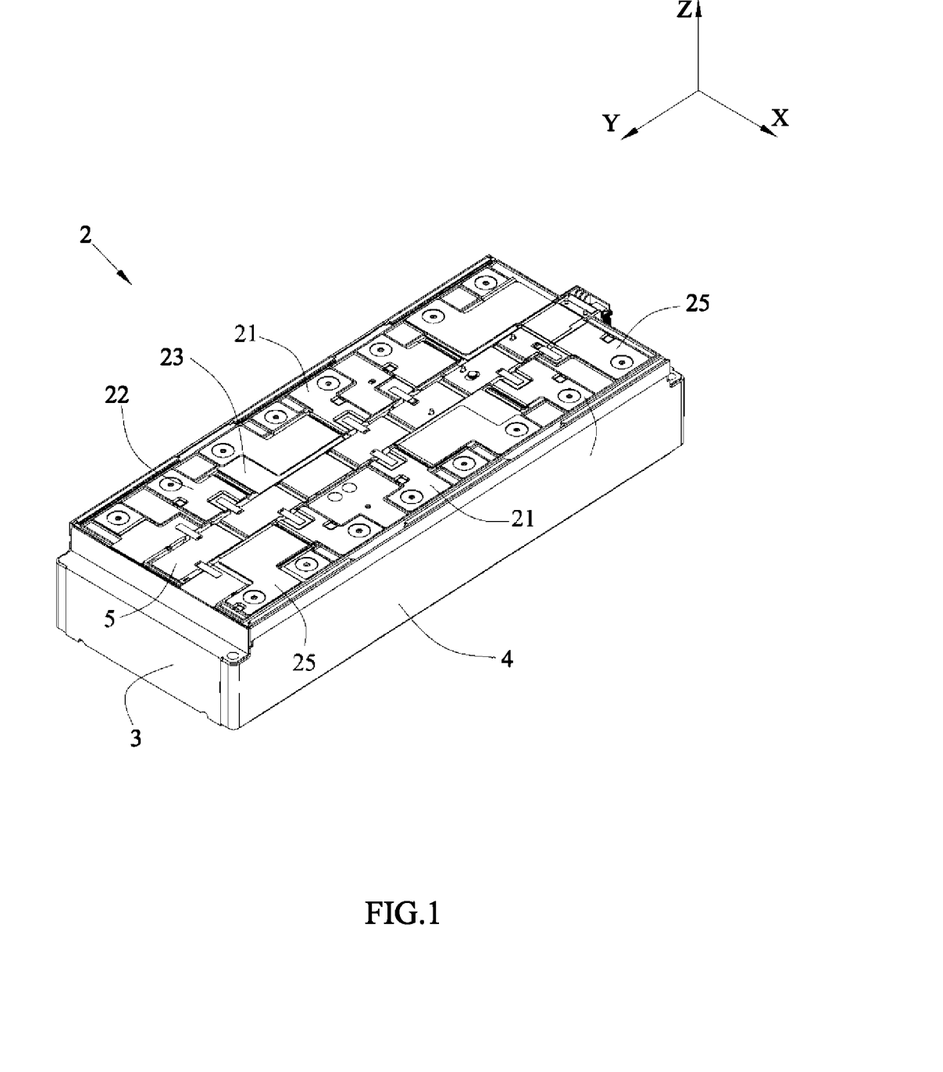
FIG. 1 is a schematic view of a battery module according to the present disclosure.
Figure 2:
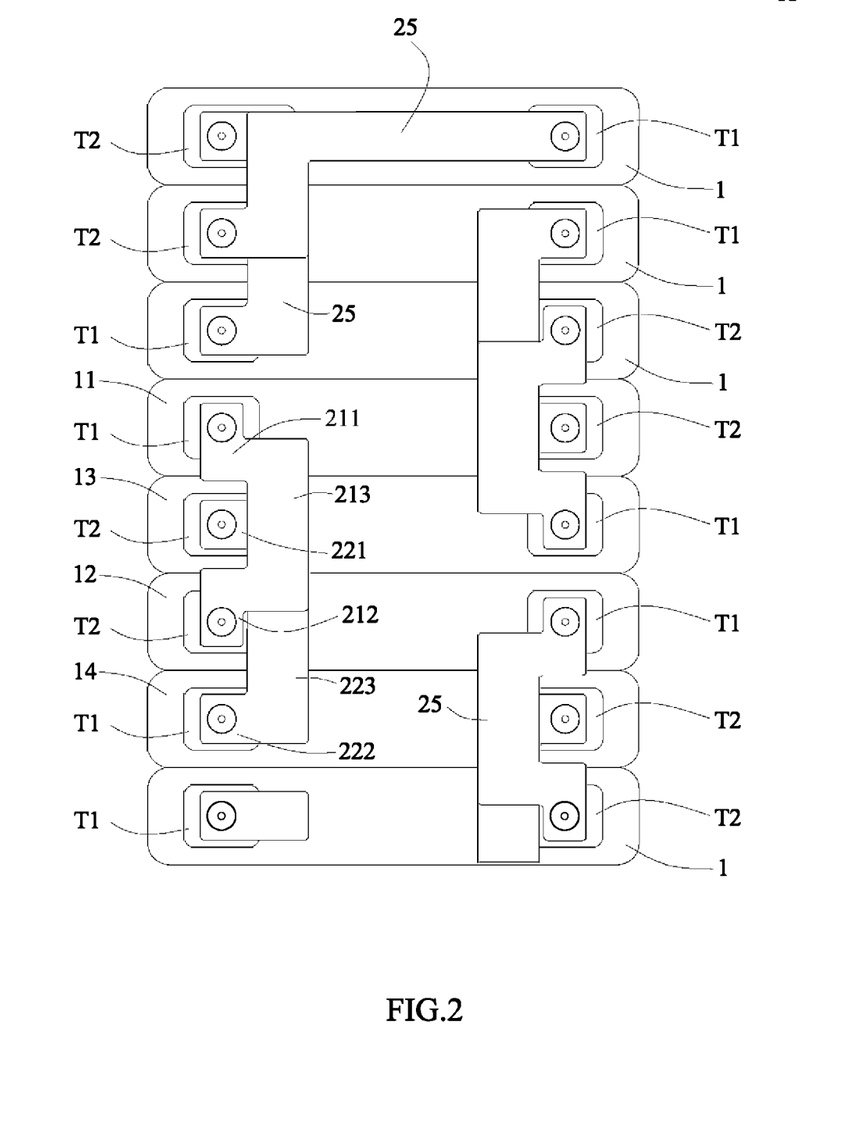
FIG. 2 is a schematic view of a battery and a busbar assembly connected together according to the present disclosure.

Referring to FIG. 1 and FIG. 2, a battery module comprises a battery 1, a busbar assembly 2, an end plate 3, a side plate 4 and a wiring harness assembly 5.

The battery 1 may be a prismatic lithium-ion battery, and have two electrode terminals protruding from the top thereof, that is a positive electrode terminal T1 and a negative electrode terminal T2. The battery 1 is provided as plurality in number and the batteries 1 are sequentially arranged in a longitudinal direction Y. The end plate 3 is provided as two in number and the two end plates 3 are respectively provided to two ends of the batteries 1 in the longitudinal direction Y, the side plate 4 is provided as two in number and the two side plates 4 are respectively provided to two sides of the batteries 1 in a transverse direction X, the end plates 3 and the side plates 4 are welded together to form a rectangular frame. The batteries 1 can be fixed with the frame by bonding and the like. The wiring harness assembly 5 is provided above the batteries 1. The busbar assembly 2 is fixed with the wiring harness assembly 5 and comprises a plurality of busbars, the busbars electrically connect the batteries 1, so as to realize the charge and the discharge of the battery module. The wiring harness assembly 5 can collect the information of each battery 1 via the busbars, such as the electric current, the voltage and the like.

In the battery module of the present disclosure, the batteries 1 can be divided into a plurality of battery units, each battery unit comprises at least one battery 1. The plurality of battery units can be same with each other or different with each other in the number of the battery 1. In an embodiment, referring to FIG. 2, each battery unit comprises one battery 1.

Figure 3:
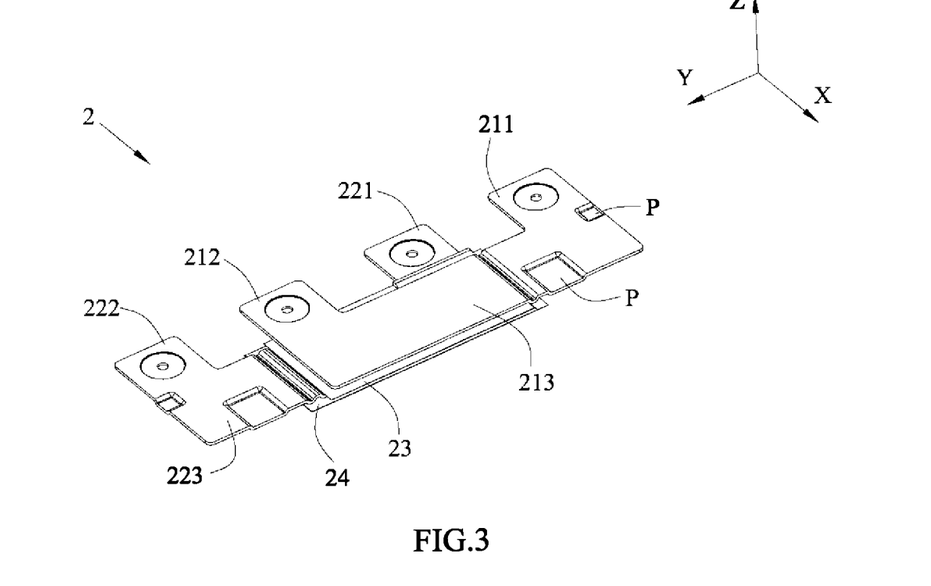
FIG. 3 is a schematic view of an embodiment of the busbar assembly according to the present disclosure.

Referring to FIG. 2 and FIG. 3, the busbar assembly 2 comprises a first busbar 21, a second busbar 22 and a first insulator 23.

The first busbar 21 comprises a first connecting portion 211, a second connecting portion 212 and a first main portion 213, the first connecting portion 211 may be connected to a first battery unit 11 by welding, the second connecting portion 212 may be connected to a second battery unit 12 by welding, the first main portion 213 connects the first connecting portion 211 and the second connecting portion 212. The first busbar 21 may be an integral metal member in the shape of plate.

In an embodiment, both of the first battery unit 11 and the second battery unit 12 each comprise one battery 1. Referring to FIG. 2, the first connecting portion 211 may be connected with the positive electrode terminal T1 of the battery 1 of the first battery unit 11; the second connecting portion 212 may be connected with the negative electrode terminal T2 of the battery 1 of the second battery unit 12. Because the first main portion 213 connects the first connecting portion 211 and the second connecting portion 212, the first busbar 21 connects the first battery unit 11 and the second battery unit 12 in series. Alternatively, in another embodiment, both of the first battery unit 11 and the second battery unit 12 each comprises a plurality of batteries 1 arranged sequentially in the longitudinal direction Y. The first connecting portion 211 may be connected with the positive electrode terminals T1 of the plurality of batteries 1 of the first battery unit 11, so as to connect the plurality of batteries 1 of the first battery unit 11 in parallel; the second connecting portion 212 may be connected with the negative electrode terminals T2 of the plurality of batteries 1 of the second battery unit 12, so as to connect the plurality of batteries 1 of the second battery unit 12 in parallel. Because the first main portion 213 connects the first connecting portion 211 and the second connecting portion 212, the first busbar 21 connects the first battery unit 11 and the second battery unit 12 in series.

The second busbar 22 comprises a third connecting portion 221, a fourth connecting portion 222 and a second main portion 223, the third connecting portion 221 may be connected to a third battery unit 13 by welding, the fourth connecting portion 222 may be connected to a fourth battery unit 14 by welding, the second main portion 223 connects the third connecting portion 221 and the fourth connecting portion 222. The second busbar 22 may be an integral metal member in the shape of plate.

In an embodiment, both of the third battery unit 13 and the fourth battery unit 14 each comprise one battery 1. Referring to FIG. 2, the third connecting portion 221 may be connected with the negative electrode terminal T2 of the battery 1 of the third battery unit 13, the fourth connecting portion 222 may be connected with the positive electrode terminal T1 of the battery 1 of the fourth battery unit 14. Because the second main portion 223 connects the third connecting portion 221 and the fourth connecting portion 222, the second busbar 22 connects the third battery unit 13 and the fourth battery unit 14 in series.

In the battery module, the first battery unit 11, the third battery unit 13, the second battery unit 12 and the fourth battery unit 14 are arranged sequentially in the longitudinal direction Y, so that the first main portion 213 extends to cross the third battery unit 13, the second main portion 223 extends to cross the second battery unit 12.

In order to save the space occupied by the first busbar 21 and the second busbar 22 in the transverse direction X and assemble the first busbar 21 and the second busbar 22 easily, the first main portion 213 and the second main portion 223 are preferably arranged up and down in a height direction Z. When the first main portion 213 and the second main portion 223 are arranged up and down, the first main portion 213 and the second main portion 223 will be partially overlapped with each other in the height direction Z, and there is a risk that the first main portion 213 and the second main portion 223 contact with each other. By providing the first insulator 23 between the first busbar 21 and the second busbar 22, the present disclosure can insulate the first main portion 213 from the second main portion 223, and avoid an electrical connection between the first busbar 21 and the second busbar 22.

In order to satisfy the requirement of the creepage distance and the electric clearance between the first busbar 21 and the second busbar 22, an edge of the first insulator 23 should be beyond an overlapped region between the second main portion 223 and the first main portion 213; preferably, the edge of the first insulator 23 is beyond the overlapped region by at least 2 mm. The first insulator 23 functions for insulation, compression resistance, bonding and polymerization, and two surfaces of the first insulator 23 are respectively bonded to the first main portion 213 and the second main portion 223.

Referring to FIG. 1 and FIG. 2, the busbar assembly 2 further comprises a plurality of third busbars 25, the first busbar 21, the second busbar 22 and the third busbars 25 connect all the batteries 1 together.

In the battery module of the present disclosure, the busbar can connect batteries 1 between which other battery is interposed, and by allowing the busbars to reasonably cooperate with each other, it can realize the diversification of an electrical circuit in the battery module, satisfy the requirement of the battery module on diversified electrical circuit.

In addition, by allowing the busbars to reasonably cooperate with each other, it further can position a positive output electrode and a negative output electrode at the same side, realize the output of the battery module at the same side, and simplify a connecting structure between battery modules.

Referring to FIG. 3 to FIG. 7, the first connecting portion 211, the third connecting portion 221, the second connecting portion 212 and the fourth connecting portion 222 are sequentially arranged and spaced from each other in the longitudinal direction Y, a distance between every two adjacent portions is at least beyond 2 mm, so as to satisfy the requirement of creepage distance and electric clearance. The first connecting portion 211 and the second connecting portion 212 are positioned at the same side with respect to the first main portion 213 in the transverse direction X, the third connecting portion 221 and the fourth connecting portion 222 are positioned at the same side with respect to the second main portion 223 in the transverse direction X.

Hereinafter the busbar assembly 2 of the present disclosure will be described in combination with different embodiments.

Figure 4:
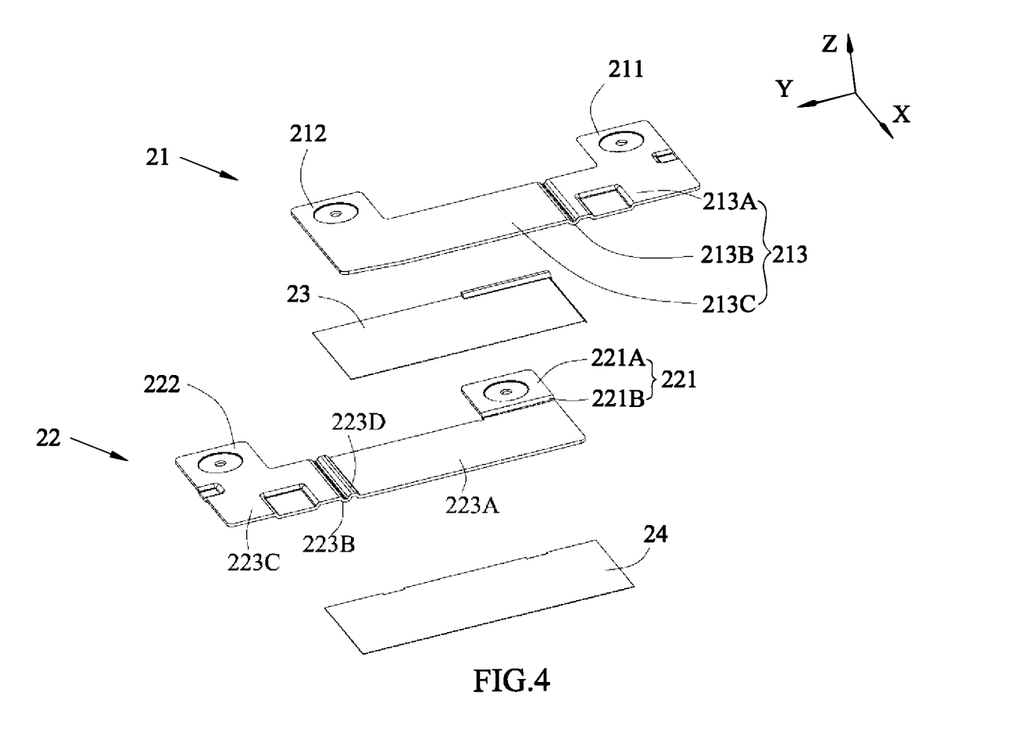
FIG. 4 is an exploded view of the busbar assembly of FIG. 3.

In a first embodiment, referring to FIG. 3 and FIG. 4, the first busbar 21 and the second busbar 22 can have similar structures. The first busbar 21 and the second busbar 22 can be arranged up and down in the height direction Z. In the embodiment, the first busbar 21 is provided above the second busbar 22; certainly, in an alternative embodiment, the first busbar 21 also can be provided below the second busbar 22.

Specifically, at least a part of the first main portion 213 is positioned above the second main portion 223. Because the second main portion 223 is position below the first main portion 213, when the second main portion 223 crosses the second battery unit 12, it may contact the battery 1 (especially the electrode terminal) of the second battery unit 12. In the present disclosure, a second insulator 24 is bonded on a surface of the second main portion 223 close to the battery 1 of the second battery unit 12, and the second insulator 24 can insulate the second main portion 223 from the battery 1 of the second battery unit 12.

In the battery module, all the batteries 1 have same specifications, so distances between electrode terminals of every two adjacent batteries 1 are equal. When the first battery unit 11, the second battery unit 12, the third battery unit 13 and the fourth battery unit 14 are equal in the number of battery 1, in the longitudinal direction Y, an overall length of the first busbar 21 is generally equal to an overall length of the second busbar 22.

Referring to FIG. 4, two ends of the second main portion 223 in the longitudinal direction Y are respectively flush with an outer end of the third connecting portion 221 and an outer end of the fourth connecting portion 222; in other words, in the longitudinal direction Y, a length of the second main portion 223 is equal to an overall length of the second busbar 22. Similarly, two ends of the first main portion 213 in the longitudinal direction Y are respectively flush with an outer end of the first connecting portion 211 and an outer end of the second connecting portion 212.

Figure 5:
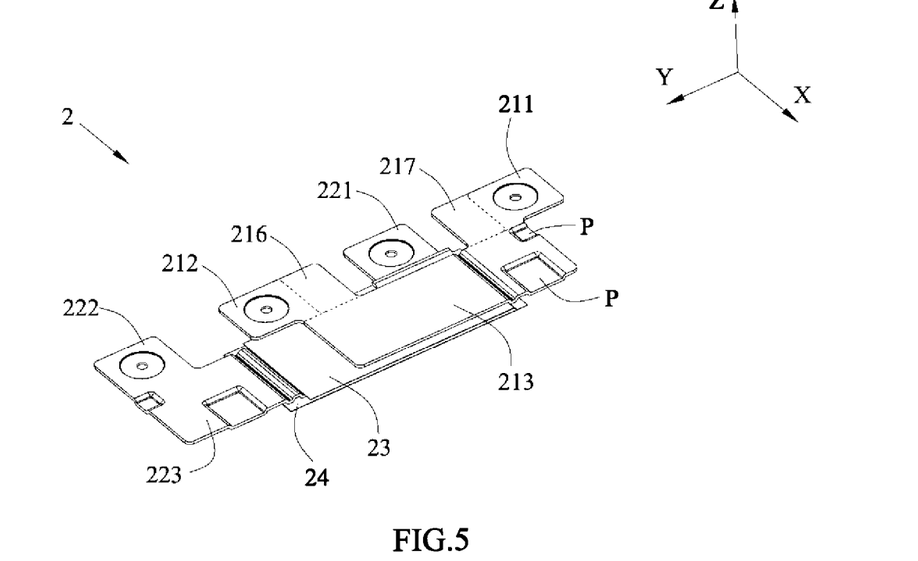
FIG. 5 is a schematic view of another embodiment of the busbar assembly according to the present disclosure.
Figure 6:
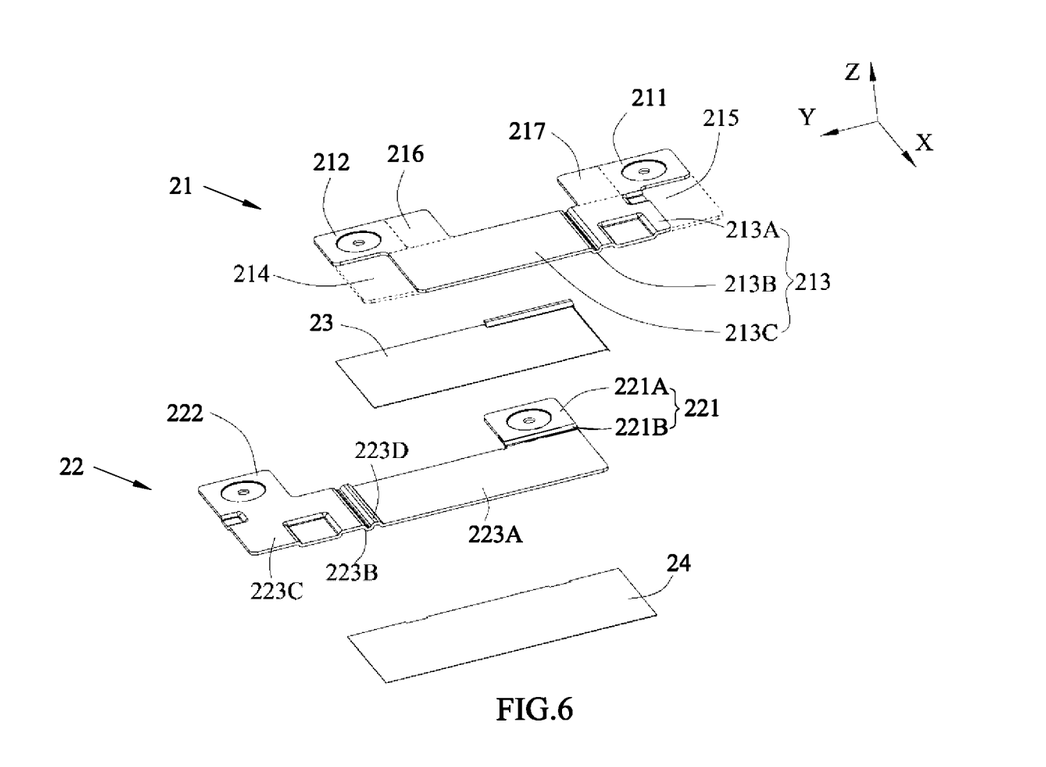
FIG. 6 is an exploded view of the busbar assembly of FIG. 5.
Figure 7:
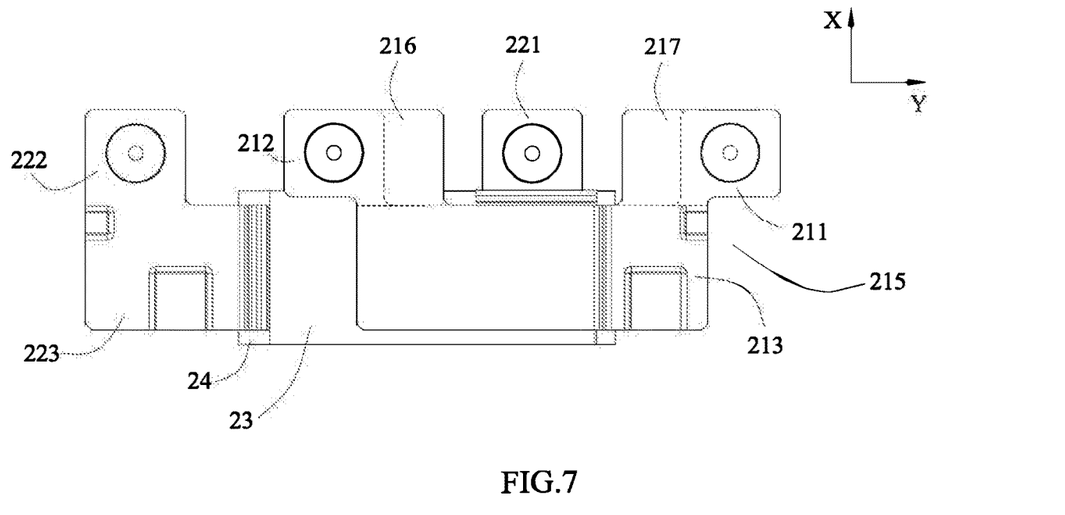
FIG. 7 is a top view of the busbar assembly of FIG. 5.

Referring to FIG. 5 to FIG. 7, a second embodiment of the present disclosure is substantially the same as the first embodiment, and the difference between the two embodiments lies in a structure of the first busbar 21.

The first busbar 21 is provided with a first notch 214, the first notch 214 can shorten heat transfer path and reduce an amount of heat generated in the first busbar 21.

In the busbar assembly 2 of the present disclosure, the first main portion 213 and the second main portion 223 are partially overlapped with each other in the height direction Z, and the heat is prone to be accumulated in the overlapped region; the first insulator 23 is positioned between the second main portion 223 and the first main portion 213, if the temperature rises excessively, the first insulator 23 is prone to be burnt out easily, thereby leading to failure of insulation. Specially, in the first embodiment, an area of the overlapped region between the first main portion 213 and the second main portion 223 is large, the dissipating efficiency of heat is low, and the heat is more prone to be accumulated.

Compared to the first embodiment, referring to FIG. 6, the first busbar 21 of the second embodiment is provided with the first notch 214, and the first notch 214 is positioned above or below the second main portion 223 in the height direction Z. The first notch 214 can increase an exposed area of the first insulator 23 or an exposed area of the second main portion 223, provide heat dissipating passage for the second main portion 223 and the first insulator 23, improve dissipating efficiency of heat, reduce accumulation of heat.

Preferably, the first busbar 21 is provided above the second busbar 22, correspondingly, in the height direction Z, both of the first main portion 213 and the first notch 214 are positioned above the second main portion 223. The battery 1 generates heat in the process of work, so the temperature of the space below the busbar assembly 2 is generally higher than the temperature of the space above the busbar assembly 2. By providing the first notch 214 above the second main portion 223, it can expose the first insulator 23 or the second main portion 223 to the space above the busbar assembly 2, thereby improving dissipating efficiency of heat.

A position of the first notch 214 can be determined depending on requirement. If the first notch 214 is directly provided to an interior of the first main portion 213, it will decrease the overcurrent area of the first main portion 213 in the position of the first notch 214. Therefore, preferably, the first notch 214 is positioned at an end of the first main portion 213 in the longitudinal direction Y, the first main portion 213 and the second connecting portion 212 form boundaries of the first notch 214. At this time, the first notch 214 only decreases an overall length of the first main portion 213 in the longitudinal direction Y, but will not affect the overcurrent area of the first main portion 213.

Compared FIG. 4 with FIG. 6, the first busbar 21 of the second embodiment is provided with the first notch 214, and the first notch 214 will decrease an overcurrent area of the connecting position between the first main portion 213 and the second connecting portion 212, affect the overcurrent capability of the first busbar 21. Therefore, preferably, the first busbar 21 of the second embodiment further comprises a first extending portion 216, the first extending portion 216 is provided at a side of the second connecting portion 212 close to the first connecting portion 211, and the first extending portion 216 connects the second connecting portion 212 and the first main portion 213. The first extending portion 216 can have a function of adapter, thereby increasing the overcurrent area between the first main portion 213 and the second connecting portion 212, ensuring the overcurrent capability of the first busbar 21.

The first busbar 21 is further provided with a second notch 215, the first notch 214 and the second notch 215 are respectively positioned at two ends of the first main portion 213 in the longitudinal direction Y. The first main portion 213 and the first connecting portion 211 form boundaries of the second notch 215. Although the second notch 215 does not decrease the area of the overlapping region between the first main portion 213 and the second main portion 223, it can shorten the heat transfer path and reduce an amount of heat generated.

Similarly, the second notch 215 also decreases an area of the connecting position between the first main portion 213 and the first connecting portion 211, affects the overcurrent capability of the first busbar 21. Therefore, preferably, the first busbar 21 further comprises a second extending portion 217, the second extending portion 217 is provided at a side of the first connecting portion 211 close to the second connecting portion 212, and the second extending portion 217 connects the first connecting portion 211 and the first main portion 213.

In the first busbar 21, the first connecting portion 211, the second extending portion 217 and the first main portion 213 form a bending structure in the shape of "Z"; similarly, the second connecting portion 212, the first extending portion 216 and the first main portion 213 form a bending structure in the shape of "Z". In the working process of the battery module, the batteries 1 will swell; if the batteries 1 swell, a stretching stress will be applied to the first busbar 21 and the second busbar 22. Compared to the first busbar 21 of the first embodiment, the first busbar 21 of the second embodiment having the bending structure in the shape of "Z" helps dispersal of stress, and is not prone to fracture in bending position.

Referring to FIG. 6, the first main portion 213 comprises a first region 213A, a second region 213B and a third region 213C, the first region 213A, the second region 213B and the third region 213C are arranged sequentially in the longitudinal direction Y; the first region 213A is connected with the first connecting portion 211, the third region 213C is connected with the second connecting portion 212, the second region 213B is positioned between the first region 213A and the third region 213C. In the height direction Z, the third region 213C and the second main portion 223 are overlapped with each other; in the longitudinal direction Y, both of the first region 213A and the second region 213B are positioned outside the second main portion 223.

In the assembling process of the battery module, the batteries 1 need to be stacked sequentially; a height difference may exist among the batteries 1 in the height direction Z due to assembling errors. The first busbar 21 needs to be welded to the first battery unit 11 and the second battery unit 12 at the same time, when a height difference exists between the first battery unit 11 and the second battery unit 12, the first connecting portion 211 and the second connecting portion 212 can not be attached to the electrode terminals at the same time, which is prone to lead to poor welding. In the present disclosure, the second region 213B is preferably arch in shape, the first busbar 21 can bend in the position of the second region 213B, so even if the height difference exists between the first battery unit 11 and the second battery unit 12, it also can ensure that the first connecting portion 211 and the second connecting portion 212 are attached to the electrode terminals at the same time, and avoid poor welding. In addition, when the batteries 1 swell, the second region 213B which is arch in shape can be deformed under the affect of the stretching stress, thereby absorbing stress, avoiding the first busbar 21 being fractured.

Because the second region 213B is positioned outside the second main portion 223, the second region 213B can protrude downwardly relative to the first region 213A and the third region 213C. Thus an overall height of the busbar assembly 2 does not increase, thereby sufficiently making use of the space. In addition, the second region 213B can be provided as one in number; certainly, as long as the space permits, the second region 213B also can be provided as plurality in number, and the plurality of the second regions 213B are arranged in the longitudinal direction Y.

In the battery module, regardless of the assembling errors, the electrode terminals of all batteries 1 should be flush with each other, so all of the first connecting portion 211, the second connecting portion 212, the third connecting portion 221 and the fourth connecting portion 222 should be positioned in a plane. Because the first busbar 21 and the second busbar 22 are arranged up and down in the height direction Z, the first busbar 21 or the second busbar 22 needs to be bent, so as to position the first connecting portion 211, the second connecting portion 212, the third connecting portion 221 and the fourth connecting portion 222 in the plane.

Specifically, referring to FIG. 6, the second main portion 223 comprises a fourth region 223A, a fifth region 223B and a sixth region 223C, the fourth region 223A, the fifth region 223B and the sixth region 223C are arranged sequentially in the longitudinal direction Y. The sixth region 223C is connected with the fourth connecting portion 222, the fifth region 223B is connected with the sixth region 223C and bends downwardly relative to the sixth region 223C, and the fourth region 223A is connected with the fifth region 223B and overlaps the first main portion 213 in the height direction Z. By bending the second main portion 223, it can make the fourth connecting portion 222 be flush with the first connecting portion 211.

The third connecting portion 221 comprises a seventh region 221A and an eighth region 221B, the seventh region 221A is connected with the third battery unit 13, the eighth region 221B is connected with the seventh region 221A and bends downwardly relative to the seventh region 221A, the fourth region 223A is connected with the eighth region 221B. The seventh region 221A is in the shape of flat plate and flush with the first connecting portion 211. The first insulator 23 further covers the eighth region 221B, so as to avoid the eighth region 221B contacting the first main portion 213.

Preferably, the second main portion 223 further comprises a ninth region 223D which is arch in shape, the ninth region 223D is positioned between the fourth region 223A and the fifth region 223B. The function of the ninth region 223D of the second main portion 223 is the same as the function of the second region 213B of the first main portion 213, which is used for absorbing the height difference between the batteries 1 and the swelling stress of the batteries 1. The ninth region 223D may be directly connected with the fifth region 223B, the ninth region 223D and the fifth region 223B form a continuously bending structure, thus the fifth region 223B also can be used for absorbing the height difference between the batteries 1 and the swelling stress of the batteries 1.

The ninth region 223D preferably protrudes upwardly relative to the fourth region 223A, thus the overall height of the busbar assembly 2 will not increase, thereby sufficiently making use of the space. The ninth region 223D can be provided as one in number; certainly, as long as the space permits, the ninth region 223D also can be provided as plurality in number, and the plurality of ninth regions 223D are arranged in the longitudinal direction Y.

Referring to FIG. 5, all of the first connecting portion 211, the second connecting portion 212, the third connecting portion 221 and the fourth connecting portion 222 each are provided with a recognizing hole for positioning during welding.

A plurality of recessed portions P may be formed in the first main portion 213 and the second main portion 223 by stamping. Referring to FIG. 1 and FIG. 3, the wiring harness assembly 5 is provided with protrusions, the protrusions extend into one recessed portion P of the first main portion 213 and one recessed portion P of the second main portion 223, thereby fixing the first busbar 21 and the second busbar 22 to the wiring harness assembly 5. The wiring harness assembly 5 also can be connected to another recessed portion P of the first main portion 213 and another recessed portion P of the second main portion 223 by nickel pieces, the nickel pieces can transmit the information, such as electric current and voltage of the batteries 1, to the wiring harness assembly 5.

What is claimed is:

1. A busbar assembly of a battery module, comprising a first busbar, a second busbar and a first insulator;
the first busbar comprising a first connecting portion, a second connecting portion and a first main portion, the first connecting portion being capable of being connected to a first battery unit of the battery module, the second connecting portion being capable of being connected to a second battery unit of the battery module, the first main portion connecting the first connecting portion and the second connecting portion;
the second busbar comprising a third connecting portion, a fourth connecting portion and a second main portion, the third connecting portion being capable of being connected to a third battery unit of the battery module, the fourth connecting portion being capable of being connected to a fourth battery unit of the battery module, the second main portion connecting the third connecting portion and the fourth connecting portion;
in a height direction of the battery module, the first main portion and the second main portion being partially overlapped with each other, and the first insulator insulating the second main portion and the first main portion;
the first battery unit, the third battery unit, the second battery unit and the fourth battery unit being capable of being arranged sequentially in a longitudinal direction of the battery module,
the first connecting portion, the third connecting portion, the second connecting portion and the fourth connecting portion are sequentially arranged and spaced from each other in the longitudinal direction; and
the first connecting portion and the second connecting portion are positioned at the same side with respect to the first main portion in a transverse direction of the battery module, the third connecting portion and the fourth connecting portion are positioned at the same side with respect to the second main portion in the transverse direction.

2. The busbar assembly according to claim 1, wherein the first busbar is provided with a first notch.

3. The busbar assembly according to claim 2, wherein the first notch is positioned above the second main portion in the height direction.

4. The busbar assembly according to claim 3, wherein the first notch is positioned at an end of the first main portion in the longitudinal direction.

5. The busbar assembly according to claim 4, wherein the first busbar further comprises a first extending portion, the first extending portion is provided at a side of the second connecting portion close to the first connecting portion, and the first extending portion connects the second connecting portion and the first main portion.

6. The busbar assembly according to claim 2, wherein the first busbar is further provided with a second notch, the second notch and the first notch are respectively positioned at two ends of the first main portion in the longitudinal direction.

7. The busbar assembly according to claim 6, wherein the first busbar further comprises a second extending portion, the second extending portion is provided at a side of the first connecting portion close to the second connecting portion, and the second extending portion connects the first connecting portion and the first main portion.

8. The busbar assembly according to claim 1, wherein
the first main portion comprises a first region, a second region and a third region, the first region, the second region and the third region are arranged sequentially in the longitudinal direction;
the first region is connected with the first connecting portion, the third region is connected with the second connecting portion, the second region is positioned between the first region and the third region;
in the height direction, the third region and the second main portion are overlapped with each other;
the second region is arch in shape and protrudes relative to the first region and the third region.

9. The busbar assembly according to claim 1, wherein
the second main portion comprises a fourth region, a fifth region and a sixth region, the fourth region, the fifth region and the sixth region are arranged sequentially in the longitudinal direction;
the sixth region is connected with the fourth connecting portion, the fifth region is connected with the sixth region and bends relative to the sixth region, the fourth region is connected with the fifth region and overlaps the first main portion in the height direction;
the third connecting portion comprises a seventh region and an eighth region, the seventh region is capable of being connected with the third battery unit, the eighth region is connected with the seventh region and bends relative to the seventh region, the fourth region is connected with the eighth region.

10. The busbar assembly according to claim 9, wherein
the second main portion further comprises a ninth region, the ninth region is positioned between the fourth region and the fifth region;
the second main portion is arch in shape and protrudes relative to the fourth region.

11. A battery module, comprising a first battery unit, a second battery unit, a third battery unit, a fourth battery unit and a busbar assembly;
the first battery unit, the third battery unit, the second battery unit and the fourth battery unit being arranged sequentially in a longitudinal direction of the battery module;
the busbar assembly comprising a first busbar, a second busbar and a first insulator;
the first busbar comprising a first connecting portion, a second connecting portion and a first main portion, the first connecting portion being connected with the first battery unit, the second connecting portion being connected with the second battery unit, the first main portion connecting the first connecting portion and the second connecting portion;
the second busbar comprising a third connecting portion, a fourth connecting portion and a second main portion, the third connecting portion being connected with the third battery unit, the fourth connecting portion being connected with the fourth battery unit, the second main portion connecting the third connecting portion and the fourth connecting portion;
in a height direction of the battery module, the first main portion and the second main portion being partially overlapped with each other, and the first insulator insulating the second main portion and the first main portion,
the first connecting portion, the third connecting portion, the second connecting portion and the fourth connecting portion are sequentially arranged and spaced from each other in the longitudinal direction; and
the first connecting portion and the second connecting portion are positioned at the same side with respect to the first main portion in a transverse direction of the battery module, the third connecting portion and the fourth connecting portion are positioned at the same side with respect to the second main portion in the transverse direction.

12. The battery module according to claim 11, wherein
the first busbar is provided with a first notch;
the first notch is positioned above the second main portion in the height direction;
the first notch is positioned at an end of the first main portion in the longitudinal direction.

13. The battery module according to claim 12, wherein the first busbar further comprises a first extending portion, the first extending portion is provided at a side of the second connecting portion close to the first connecting portion, and the first extending portion connects the second connecting portion and the first main portion.

14. The battery module according to claim 12, wherein the first busbar is further provided with a second notch, the second notch and the first notch are respectively positioned at two ends of the first main portion in the longitudinal direction.

15. The battery module according to claim 14, wherein the first busbar further comprises a second extending portion, the second extending portion is provided at a side of the first connecting portion close to the second connecting portion, and the second extending portion connects the first connecting portion and the first main portion.

16. The battery module according to claim 11, wherein
the first main portion comprises a first region, a second region and a third region, the first region, the second region and the third region are arranged sequentially in the longitudinal direction;
the first region is connected with the first connecting portion, the third region is connected with the second connecting portion, the second region is positioned between the first region and the third region;

in the height direction, the third region and the second main portion are overlapped with each other;

the second region is arch in shape and protrudes relative to the first region and the third region.

17. The battery module according to claim 11, wherein the second main portion comprises a fourth region, a fifth region and a sixth region, the fourth region, the fifth region and the sixth region are arranged sequentially in the longitudinal direction;

the sixth region is connected with the fourth connecting portion, the fifth region is connected with the sixth region and bends relative to the sixth region, the fourth region is connected with the fifth region and overlaps the first main portion in the height direction;

the third connecting portion comprises a seventh region and an eighth region, the seventh region is connected with the third battery unit, the eighth region is connected with the seventh region and bends relative to the seventh region, the fourth region is connected with the eighth region.

18. The battery module according to claim 17, wherein the second main portion further comprises a ninth region, the ninth region is positioned between the fourth region and the fifth region;

the second main portion is arch in shape and protrudes relative to the fourth region.

* * * * *